Jan. 13, 1970  R. L. JACKSON  3,488,949
BALANCED THREE-BELLOWS EXPANSION JOINT
Filed Aug 1, 1966  2 Sheets-Sheet 1
FIG.1 (PRIOR ART)
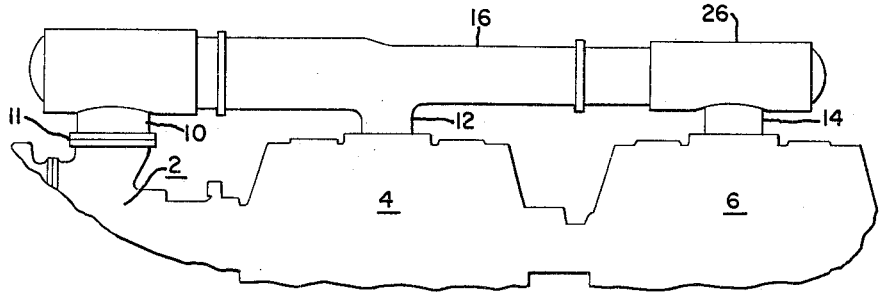
FIG.2 (BACKGROUND)
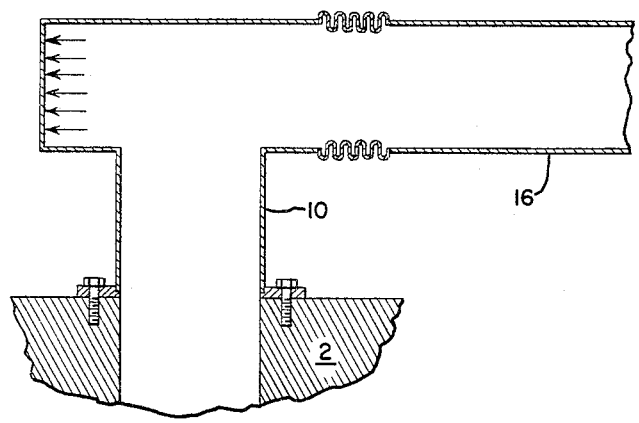
FIG.3 (PRIOR ART)
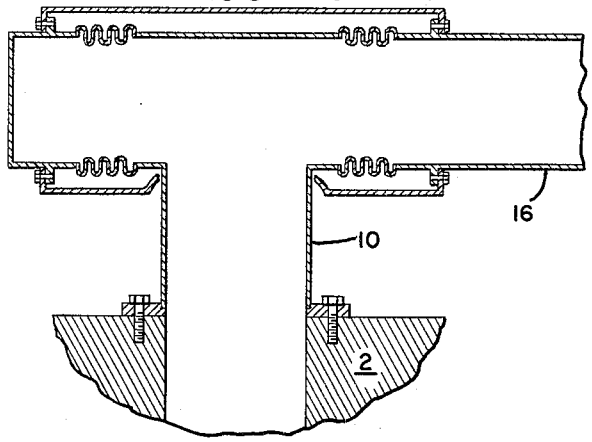
INVENTOR:
ROBERT L. JACKSON,
BY  *Robert J. Beirl*
HIS ATTORNEY.

Jan. 13, 1970 R. L. JACKSON 3,488,949
BALANCED THREE-BELLOWS EXPANSION JOINT
Filed Aug 1, 1966 2 Sheets-Sheet 2
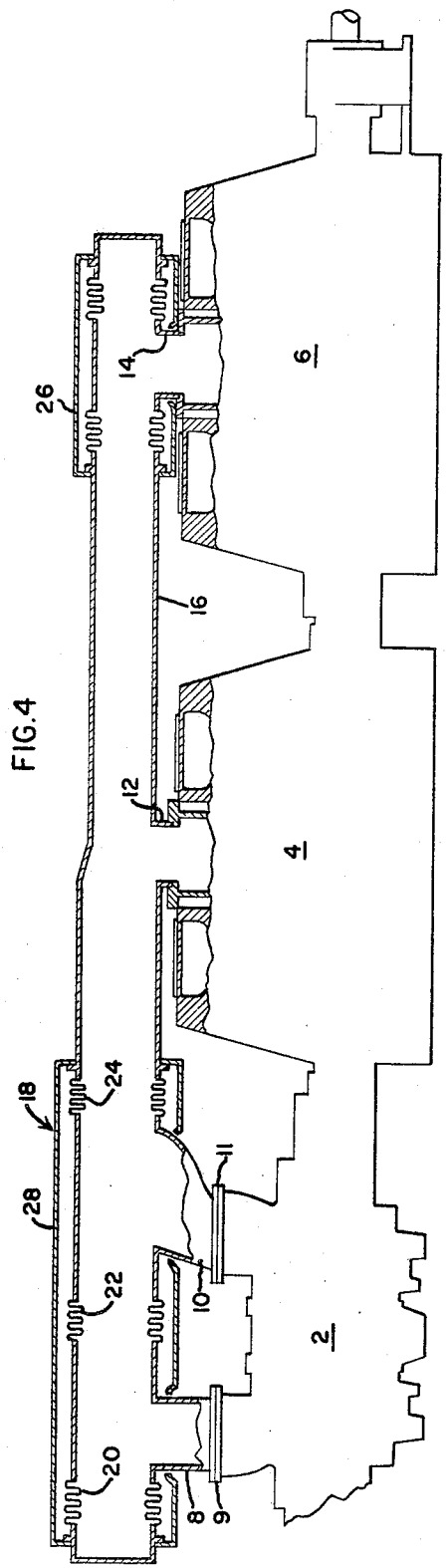
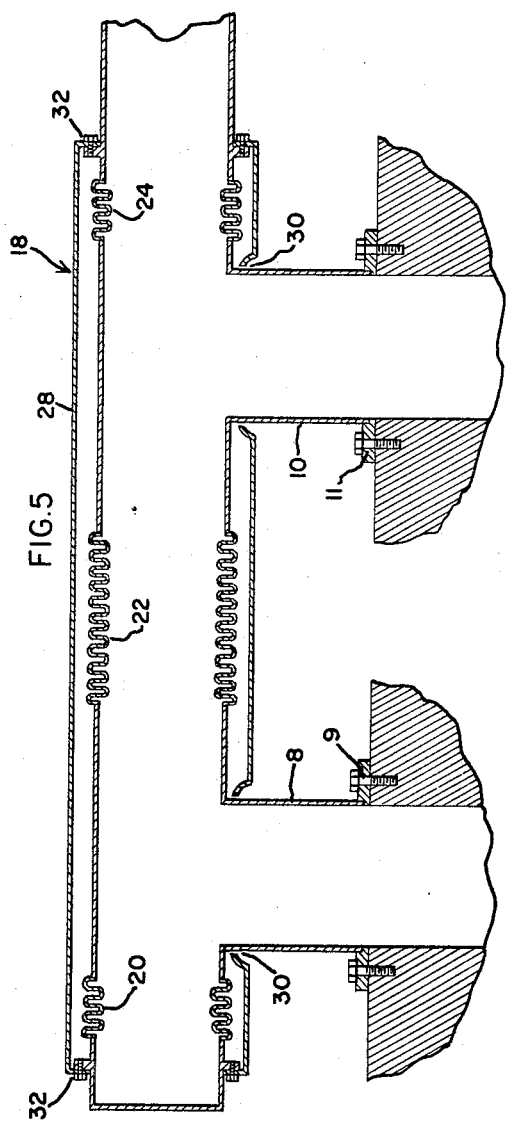
INVENTOR:
ROBERT L. JACKSON,
BY *Robert J. Bird*
HIS ATTORNEY.

United States Patent Office 3,488,949
Patented Jan. 13, 1970

3,488,949
BALANCED THREE-BELLOWS EXPANSION JOINT
Robert L. Jackson, Schenectady, N.Y., assignor to General Electric Company, a corporation of New York
Filed Aug. 1, 1966, Ser. No. 569,323
Int. Cl. F02b 73/00; F02c 7/20; F01b 21/00
U.S. Cl. 60—39.32                                    2 Claims

ABSTRACT OF THE DISCLOSURE

An expansion joint for a piping system which includes three separate bellows having two floating piping sections therebetween and surrounded by a wrapper plate, the two floating piping sections generally T'd and connected to the outlets of a single casing double flow reheat turbine.

This invention is related in general to expansion joints for piping systems. More particularly, it relates to a novel three-bellows expansion joint for use in piping systems subject to both thermal stress and stress resulting from fluid pressure as, for example, in the piping systems of steam powerplants.

In steam powerplants, piping systems must allow for thermal expansions and contractions as well as longitudinal and hoop stresses created by the pressurized fluid therein. One environment for the present invention is in a steam turbine-generator plant having a plural-casing turbine arrangement, including, for example, a high pressure turbine, an intermediate pressure or reheat turbine, and two low pressure turbines. Between the reheat turbine and the low pressure turbines, the piping generally leaves and enters the turbines substantially perpendicular to their axes, while running the distance from one turbine to the other generally horizontally. This means that there are sharp turns in the piping at some point near the connection flanges. It is common to include an expansion joint at each of such turns so as to harmlessly absorb the relatively small displacements resulting from thermal expansion or contraction.

FIG. 1, labeled "prior art," of the drawing is illustrative. This arrangement of the prior art shows an intermediate pressure or reheat turbine connected through a crossover to two low pressure turbines. At the T above the reheat turbine and above the last low pressure turbine, there are expansion joints.

FIGS. 2 and 3, labeled "background" and "prior art" respectievly, will aid in an understanding of the present invention. Referring to FIG. 2, assume as a starting point that the T joint above the reheat turbine were of this configuration with only one bellows on one side of the T. It is apparent that, with increasing pressure in the pipe, the bellows will be urged in an expanding direction. The only resistance to actual displacement is the bolted flange connection on the turbine casing. Such bending moments would of course be intolerable in these lines which are upwards of 40" diameter and carry steam pressure of the order of 200 p.s.i.

To overcome this, the "prior art" arrangement shown in FIG. 3 is commonly used. The expansion joint shown here has a bellows on each side of the T and a wrapper plate surrounding the whole and fixed at each end thereof to the rigid piping members of the joint outside of the bellows. The wrapper plate makes the piping a rigid whole and the steam pressure cannot damage the bellows. Furthermore, at all times, that T is floating within the rigid system, due to its resilient support at both ends or arms, on the bellows. Therefore, there is no displacement or bending moment on the turbine connection flange due to steam pressure, while thermal expansions in the crossover pipe are absorbed without harm because the bolted T connection is floating relative to the crossover. This is a balanced two-bellows expansion joint. U.S. Patent 2,721,746—Schindler contains a similar discussion and shows another such joint of the prior art.

In present day turbine systems, double flow intermediate pressure or reheat turbines are sometimes used; that is, reheat turbines having two flow paths therethrough to two outlets on a single casing which in turn lead to the low pressure turbines. In such systems it is common to have a separate crossover pipe, with all the necessary expansion joints as shown in FIG. 1, from each of the reheat turbine outlets to the low pressure turbines. This is because there has been no suitable way there to accommodate movement of reheat turbine outlets relative to one another due to expansion of the reheat casing itself. In a turbine system having, for example, a high pressure turbine, a double flow reheat turbine, and two low pressure turbines, the two required crossover pipes necessitated a total of four expansion joints having four wrapper plates and eight bellows.

The present invention permits, in the same turbine system, a single crossover with only two expansion joints having two wrapper plates and five bellows to accomplish the same result.

Accordingly, it is an object of the present invention to provide a bellows expansion joint in a single unit which replaces or performs the function of two bellows expansion joints of the prior art.

Other objects, advantages and features of the present invention will become apparent from the following description taken in connection with the accompanying drawing.

Briefly stated, the present invention is practiced in one form by an expansion joint for a piping system in a turbine powerplant which includes three separate bellows having two floating piping sections therebetween. The two floating piping sections are generally T'd and connected to the outlets of a single casing reheat turbine. Their floating characteristic eliminates stresses on the flange connections due to the pressure within the pipe.

In the drawing, wherein like members designate like elements:

FIG. 1 is a longitudinal elevation, partly in section, of a piping system according to the prior art showing its relation to a reheat steam turbine and a pair of low pressure turbines.

FIG. 2 is a sketch of a simple expansion joint by way of background.

FIG. 3 is a sectional elevation, slightly enlarged, of the details of an expansion joint of the prior art.

FIG. 4 is a longitudinal elevation, partly in section, of the present invention showing its relation to a reheat turbine and a pair of low pressure turbines.

FIG. 5 is a sectional elevation, slightly enlarged, of the details of the present invention.

Referring now to FIGS. 4 and 5, a plural-casing turbine arrangement is shown, including intermediate pressure or reheat turbine section 2, and a low pressure turbine section comprising two low pressure turbines 4 and 6. Reheat turbine 2 is of the double-flow type in a single casing having T-sections with base members 8 and 10 leading therefrom, and the separate casings of low pressure turbines 4 and 6 have inlet pipes 12 and 14 respectively leading thereto. Base members 8 and 10 are fastened to fluid connection openings 9 and 11 respectively. A crossover pipe generally indicated at 16 connects transverse base members 8 and 10 from the reheat turbine 2 to inlet pipes 12 and 14 of low pressure turbines 4, 6. At the T's formed by base members 8 and 10 and crossover pipe 16, is an expansion joint 18 comprising three bellows on a longitudinal section of piping, one on each side of transverse base members 8 and 10. similarly, the crossover pipe 16 forms a T with inlet pipes 12 and 14 respectively, and at the T formed with inlet pipe 14 a two-bellows expansion joint 26 is included. Expansion joint 18 has bellows 20, 22 and 24 therein at the other end of crossover pipe 16 with bellows 20 and 22 positioned on each side of transverse base member 8 while the same bellows 22 and bellows 24 are likewise positioned on each side of transverse base member 10. Expansion joint 18 is surrounded by a generally cylindrical wrapper plate 28 which, at anchor points 32, is bolted or otherwise fastened at one end to the piping adjacent bellows 20 and at its other end to the piping adjacent bellows 24 so that all bellows 20, 22, and 24 are within the wrapper plate. The wrapper plate defines apertures 30 for the passage therethrough of the base members of each T-section with sufficient clearance about the pipes 8, 10 for the wrapper plate to move with respect to the transverse members without imposing stresses thereon.

In operation, pressure forces within the crossover piping 16 are ineffective to produce any displacement in the expansion joint because of the wrapper plate 28 which is anchored at points 32. The longitudinal run of piping 16 is therefore a rigid pressure vessel. At the same time, thermal expansions or contractions do result in longitudinal displacement of the crossover pipe 16 relative to fluid connection openings 9 and 11. The T piping sections within expansion joint 18, however, are floating on bellows 20, 22 and 24 so that longitudinal thermal expansions or contractions in crossover pipe 16 do not stress the fluid connection openings 9 and 11. That is to say, that bellows 20, 22 and 24 permit some displacement of crossover pipe 16 relative to fixed fluid openings 9 and 11, the apertures 30 being designed with enough clearance around base members 8 and 10 as not to interfere with the expected movement.

Turbine connection openings 9 and 11 are situated at the opposite ends of reheat turbine 2, and the turbine itself is also subject to thermal expansions and contractions. Thus, points 9 and 11 are subject to relative displacement. This displacement is accommodated again by the fact that the two T-sections are floating relative to each other on bellows 22.

It will thus be apparent that a balanced three-bellows expansion joint has herein been disclosed which, by a novel combination, performs the function of two prior art expansion joints, therefore permitting substantial economie expansion joints, therefore permitting substantial economies in the expansion joint itself and its associated piping.

It may occur to others of ordinary skill in the art to make modifications of the present invention which will lie within the concept and scope thereof. Accordingly, it is intended that the invention be not limited by the details by which it has been described, but that it encompass all within the purview of the following claims.

What is claimed is:
1. A three-bellows expansion joint for a three connection fluid piping system comprising:
 a longitudinal section having an opening at one end thereof,
 first and second transverse base members extending from said longitudinal section and open at their extended ends,
 said longitudinal section and transverse base members defining a common chamber,
 bellows in said longitudinal section on each side of and between said transverse base members, and
 a cylindrical wrapper plate surrounding said longitudinal section and fixedly mounted at its ends and defining apertures for the extension therethrough of said transverse base members.

2. The combination of a turbine powerplant of the type having at least two turbine sections wherein a first section has at least two fluid connection openings and a second section has at least one fluid connection opening with each of said fluid connection openings being subject to movement relative to the others, said turbine sections connected by means of fluid cross over piping and a three-bellows expansion joint, said three-bellows expansion joint comprising:
 first and second T-shaped sections having a base member and cross members,
 said base member of first and second T-shaped piping sections each connected to one of said fluid connection openings in the first turbine section,
 a first bellows in series communication with and joined to the cross members of each of said T-shaped sections,
 each of said T-shaped sections having an extension comprising a second bellows on its other cross member opposite said first bellows,
 said extension of one cross member being capped,
 said extension of the other cross member communicating with said fluid crossover piping,
 a rigid member fastened at its ends to said extensions outboard of each of said second bellows and containing apertures therein for the passage therethrough of said base members of said T-shaped piping sections,
 a clearance between said apertures and said base members to accommodate relative movement therebetween, and
 means to connect said fluid crossover piping to said fluid connection opening of said second turbine section.

References Cited

UNITED STATES PATENTS

| | | | |
|---|---|---|---|
| 2,355,440 | 8/1944 | Howard | 285—228 |
| 3,359,016 | 12/1967 | Sarlls | 285—228 |

FOREIGN PATENTS

| | | |
|---|---|---|
| 687,148 | 4/1930 | France. |
| 725,839 | 2/1932 | France. |

HERBERT F. ROSS, Primary Examiner

U.S. Cl. X.R.

60—97